(12) United States Patent
Grace

(10) Patent No.: US 6,906,496 B1
(45) Date of Patent: Jun. 14, 2005

(54) ADAPTER FOR CONNECTION TO AN EXTERNAL POWER SOURCE

(76) Inventor: Chad Douglas Grace, 13701 Chandler St., Omaha, NE (US) 68138

(*) Notice: Subject to any disclaimer, the term of this patent is extended or adjusted under 35 U.S.C. 154(b) by 58 days.

(21) Appl. No.: 10/452,647

(22) Filed: Jun. 2, 2003

(51) Int. Cl.⁷ .............................................. H01M 10/46
(52) U.S. Cl. ..................................................... 320/110
(58) Field of Search ................................. 320/106, 107, 320/110, 112, 116; 429/96, 98, 99, 100

(56) References Cited

U.S. PATENT DOCUMENTS

| | | | |
|---|---|---|---|
| 3,586,870 A | | 6/1971 | Cwlak |
| 4,065,710 A | | 12/1977 | Zytka |
| 4,946,396 A | * | 8/1990 | Saitoh .......................... 439/500 |
| 5,296,315 A | | 3/1994 | Rein |
| 6,104,162 A | * | 8/2000 | Sainsbury et al. ........... 320/111 |
| 6,127,797 A | * | 10/2000 | Walker .......................... 320/101 |
| 6,166,519 A | * | 12/2000 | Gault ............................ 320/107 |
| 6,531,244 B1 | * | 3/2003 | Ryan et al. ................... 429/100 |
| 6,645,663 B2 | * | 11/2003 | Bean et al. .................... 429/99 |
| 6,762,584 B2 | * | 7/2004 | Harvey .......................... 320/107 |

* cited by examiner

*Primary Examiner*—Edward H. Tso
(74) *Attorney, Agent, or Firm*—Ryan T. Grace

(57) ABSTRACT

A device for providing an alternative power source for a battery operated device is generally provided with a source module and a transformer, which are electrically coupled to the battery operated device. When necessary, one or more conductor modules are electrically coupled to the battery operated device. A selector on the transformer regulates the amount of voltage provided to the source module. In use, a source module and, if necessary, one or more conductor modules are positioned within a battery operated device. The selector is adjusted to supply the correct voltage for the type and number of batteries required by the battery operated device.

26 Claims, 4 Drawing Sheets

ADAPTER FOR CONNECTION TO AN EXTERNAL POWER SOURCE

BACKGROUND OF THE INVENTION

1. Field of the Invention

The present invention relates to an external power supply device for a battery powered apparatus. More particularly, the present invention relates to a battery shaped power supply device that takes the place of conventional batteries to allow an alternative power source for a battery operated apparatus.

2. Description of the Related Art

Lately, batteries have become a preferred power source for many devices such as handheld games, appliances, radios, and baby swings. Even though many devices are manufactured with both battery and external power capability, many devices are still manufactured with only battery capability. Battery powered devices have many drawbacks. One disadvantage is that batteries need to be replaced when their energy is depleted. These depleted batteries are environmental hazards for landfills and disposal facilities. Another disadvantage is that batteries are expensive to replace. Even though rechargeable batteries do exist, they are still expensive and must usually be removed from the battery operated device for recharging.

The prior art has attempted to address the disadvantages of battery powered devices. In some cases, terminal plates have been positioned between the battery and the terminal of the battery operated device and then connected to a power supply. Even though these devices do provide external energy, they are neither easy to manufacture nor simple for a non-electrically inclined user to implement.

Accordingly, a need exists for an external power supply device that is simple to use and easy to manufacture.

SUMMARY OF THE INVENTION

In this invention an improved device and method for replacing the batteries of a battery operated device is disclosed. The device is used to provide an alternative power source for a battery operated device. The present invention generally comprises a source module electrically coupled to a battery operated device. In the situation where the battery operated device requires a plurality of batteries, the present invention also comprises one or more conductor modules electrically coupled to the battery operated device.

The source module and the conductor modules include battery shaped housings. The conductor modules have first and second electrically coupled ends and the source module has a positive and negative terminal. The positive and negative terminals of the source module are electrically coupled to a transformer. The transformer has a selector for regulating the amount of voltage to be provided to the source module.

In use, a user may position a source module and, if necessary, one or more conductor modules within a battery operated device. The source module is then electrically coupled to the transformer. The user may then use a selector on the transformer to supply the correct voltage for the type and number of batteries required by the battery operated device.

One of the principle objectives of the present invention is to provide an alternative power source for a battery operated device.

Another objective of the present invention is to provide an external power supply device that is simple for a user to implement.

Yet another objective of the present invention is to provide an external power supply device that is simple to manufacture and package.

Still another objective of the present invention is to provide an external power supply device that may be used in several types of battery operated devices.

Yet another objective of the present invention is to provide an external power supply device that a user may easily transfer between battery operated devices.

These and other objects will be apparent to those skilled in the art.

DESCRIPTION OF THE PREFERRED EMBODIMENT

Figure 1:
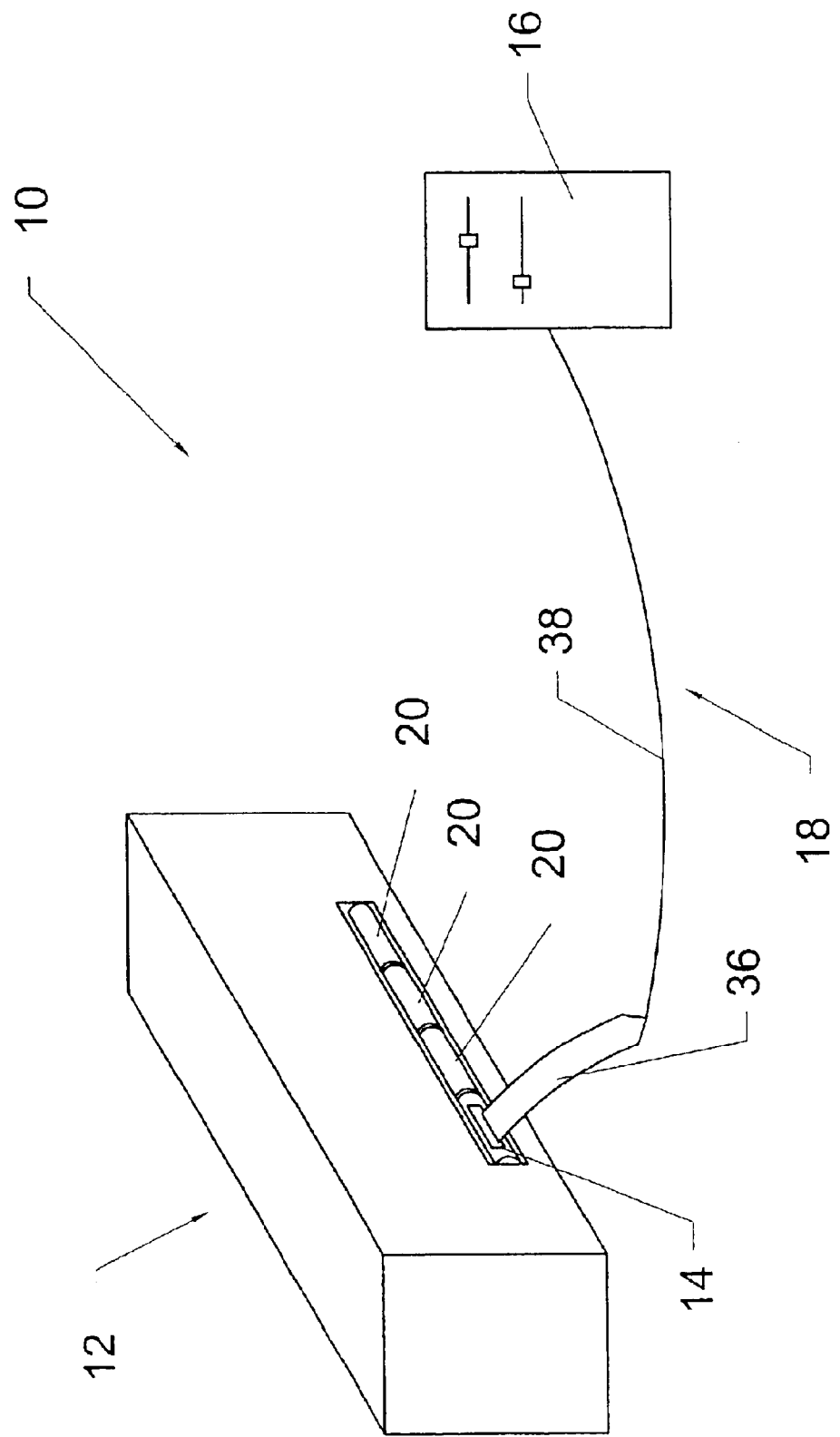
FIG. 1 is a perspective view of the external power supply device and a battery operated device.
Figure 3:
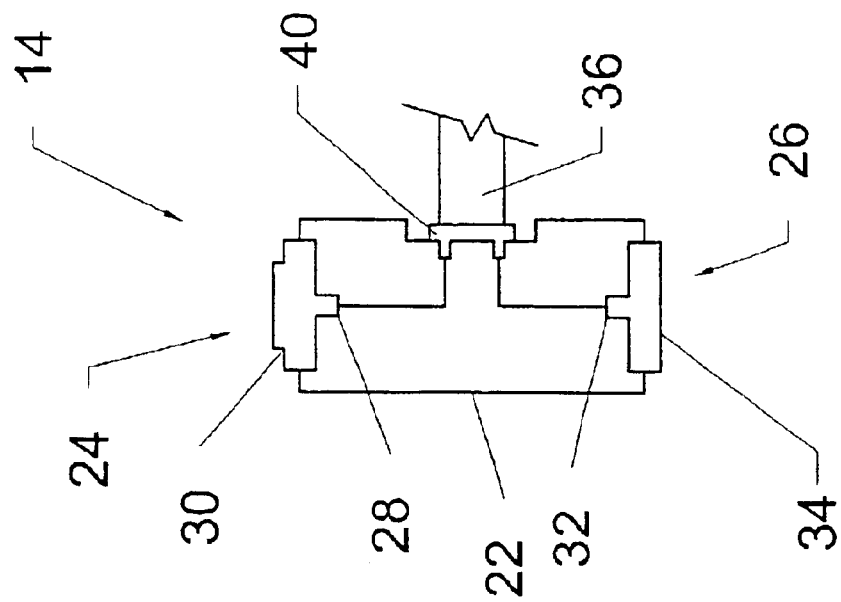
FIG. 3 is a sectional view of the source module.
Figure 2:
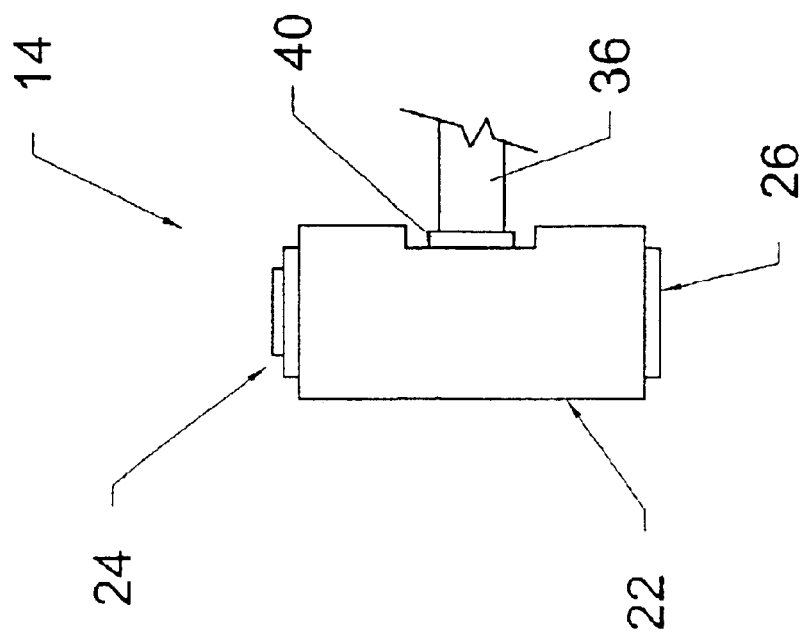
FIG. 2 is a top view of the source module in communication with the disconnect.
Figure 5:
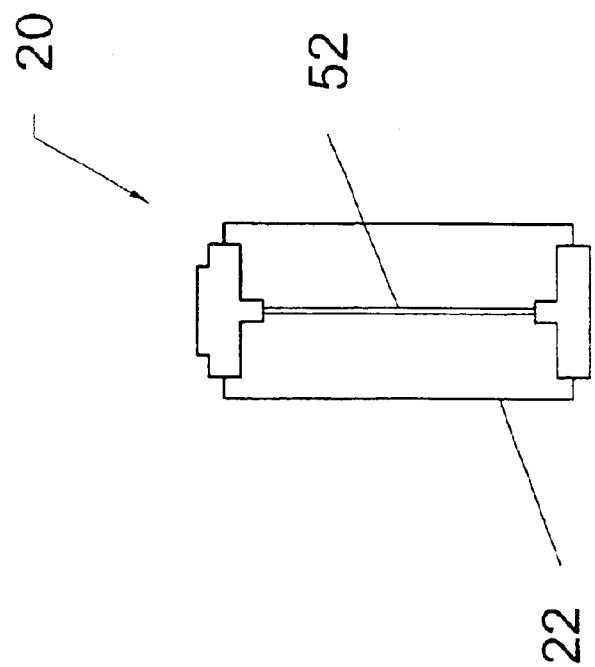
FIG. 5 is a sectional view of the conductor module.
Figure 4:
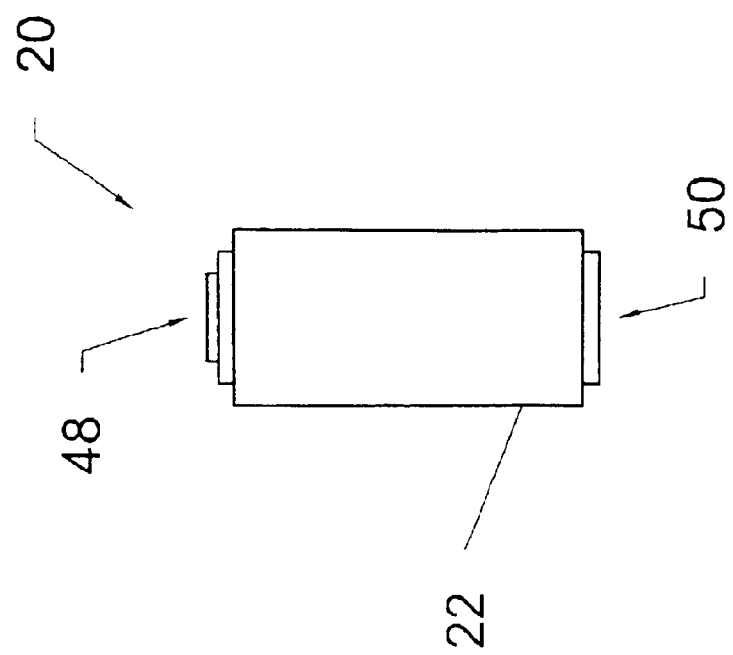
FIG. 4 is a top view of the conductor module.
Figure 6:
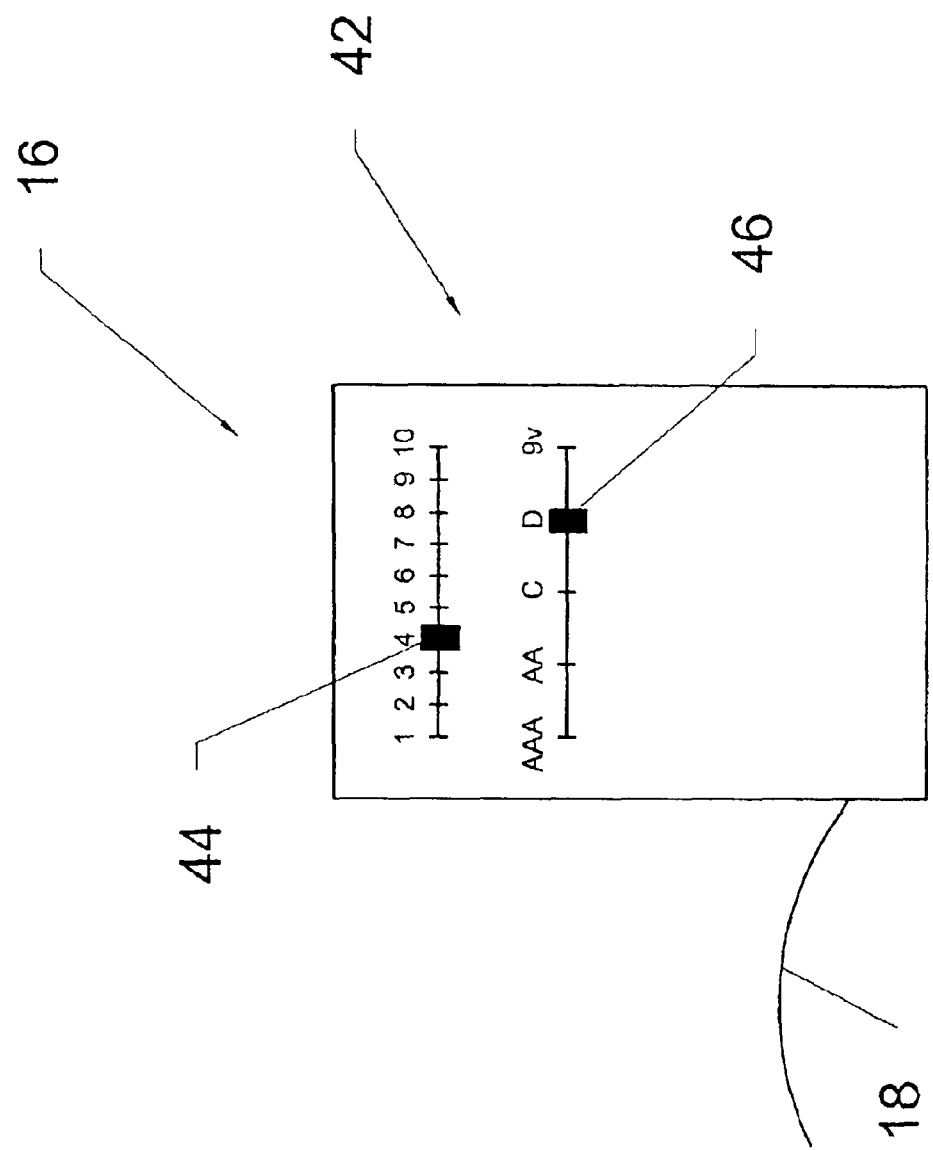
FIG. 6 is a perspective view of the selector of the transformer.

In the drawings, the external power supply device of the present invention is referred to by the reference numeral 10. The external power supply device 10 is used to provide an alternative power source for a battery operated device 12. The device 10 generally comprises a source module 14, a transformer 16, and an electrical coupling 18. In the situation where the battery operated device 12 requires a plurality of batteries, the device 10 also includes one or more conductor modules 20.

The source module 14 comprises a battery shaped housing 22. For example, the battery shaped housing 22 may be generally shaped and sized to correspond to a AAA, AA, C, D or 9 volt battery. These examples are used for illustrative purposes only and it should be known that the source module 14 could be provided with the shape of any battery that is required by the battery operated device 12. The source module 14 may also be shaped in any manner sufficient to electrically couple the positive and negative terminal of the battery operated device 12 to an energy source.

The source module 14 may further comprise a positive and negative terminal 24 and 26. Preferably, the positive terminal 24 has an inner end 28 and an outer end 30, and the negative terminal 26 has an inner end 32 and outer end 34. The inner ends 28 and 32 are electrically coupled to the transformer 16 by the electric coupling 18 and outer ends 30 and 34 are electrically coupled to the battery operated device 12. However, it should be known that the source module 14 may be electrically coupled to the transformer in any manner sufficient to provide the required energy to the battery operated device 12. For example, the electric coupling 18 might further include a ribbon cable portion 36, a gauged cable portion 38 and a disconnect 40. The disconnect 40 might comprise a plug disconnect in communication with the source module 14. The disconnect 40 might also include a quick disconnect in case an individual should trip on the coupling 18. The electric coupling 18 might include several disconnects 40 for convenience and safety.

The transformer 16 has a selector 42 for selecting the amount of voltage, which will be supplied to the source module 14. The selector 42 may be comprised of a dial, switch, button, knob, or any other apparatus known in the art for selecting a voltage. However, in the preferred embodiment, the selector 42 has at least a first and second switch 44 and 46. The first switch 44 may be toggled between a first position and an eighth position. The position of the first switch 44 indicates the number of batteries required by the battery operated device 12. The second switch 46 may be toggled between a AAA, AA, C, D or 9 volt position. The position of the second switch 46 indicates the type of battery required by the battery operated device 12.

The first switch 44 and the second switch 46 work in combination to provide the correct voltage to the battery operated device 12. For example, if a user is replacing one D sized battery, the user toggles the first switch 44 to the one position and toggles the second switch 46 to the D position. When the transformer 16 is connected to an energy source, the transformer will provide the correct voltage for one D sized battery. Furthermore, even though the transformer 16 is depicted as a wall mounted transformer, the transformer 16 may be an inline transformer or any other transformer known in the art.

In the situation where the battery operated device 12 requires a plurality of batteries, one or more conductor modules 20 may be required. Similar to the source module 14, the conductor module 20 comprises a battery shaped housing 22. For example, the battery shaped housing 22 may be generally shaped and sized to correspond to a AAA, AA, C, D or 9 volt battery. The conductor module 20 may further comprises a first and second end 48 and 50. The first end 48 is electrically coupled to the second end 50 by an electric coupling 52. The electric coupling 52 may be any coupling known to a person of skill in the art.

In use, a user may purchase a set of source modules comprising a AAA, AA, C, D and 9 volt shaped source module. The user may also purchase a set of conductor modules comprising a plurality of AAA, AA, C, D and 9 volt shaped conductor modules. As an illustration, if the user has a battery operated device that requires four D sized batteries, the user may use the device 10 as an alternative power source. Three D sized conductor modules and one D sized source module may be positioned within the battery operated device. The electric coupling 18 may then be connected to the source module 14. If the battery operated device has a battery cover, the ribbon cable portion 36 of the electrical coupling 18 may be positioned between the battery cover and the battery operated device so that the user can close the battery cover. The source module 14 is then coupled to the transformer 16 by the electric coupling 18. The user may then toggle the first switch 44 to the four position to indicate that the battery operated device requires four batteries. Next, the user may toggle the second switch 46 to the D position indicating that the battery operated device requires D sized batteries. When the transformer 16 is connected to an energy source, the transformer 16 provides the source module 14 with the correct voltage for four D sized batteries.

As another embodiment of the present invention, battery operated devices having an energy port are common in the art. In such a situation, the battery operated device is manufactured so that a user may connect a transformer directly to the port thereby making the source module 14 and the conductor module 20 unnecessary. therefore, it is contemplated that the present invention might further comprise an interchangeable adapter in electrical communication with the transformer. The adapter might include a variety of plugs having a variety of sizes and shapes to selectively communicate with the energy port of various battery operated devices. Also, the adapter might communicate with the transformer 16 to allow the adapter to be selectively switched between a positive and a negative polarity. The adapter might be part of the electrical coupling 18 or the adapter could be selectively removably coupled to the disconnect 40.

In the drawings and in the specification, there has been set forth preferred embodiments of the invention and although specific items and methods are employed, these are used in a generic and descriptive sense only and not for purposes of limitation. Changes in the form, timing and manner of events, as well as a substitution of equivalents, are contemplated as circumstances may suggest or render expedient without departing from the spirit or scope of the invention as further defined in the following claims. Furthermore, nothing in the aforementioned description of preferred embodiment is to be interpreted as an admission by the applicant of prior art.

Thus, it can be seen that the invention accomplishes at least all of its stated objectives.

I claim:

1. In combination:
   a battery operated device having a battery receptacle for maintaining at least one battery; and an external power supply device in operative electrical communication with an energy source, comprising:
   a source module having a positive and negative conductive terminal; said source module being removably positionable within said battery receptacle; said positive and negative terminal of said source module being in operative electrical communication with said energy source;
   said positive and negative terminal of said source module being in operative electrical communication with said battery operated device;
   said energy source supplying energy to said source module to thereby provide energy to said battery operated device; and
   said source module having a battery shaped housing generally shaped to correspond to one of: a AAA battery, a AA battery, a C battery, a D battery, and a 9 volt battery.

2. The combination of claim 1 wherein said positive and negative terminal of said source module includes inner and outer ends.

3. The combination of claim 2 wherein said energy source is in operative electrical communication with said inner ends of said positive and negative terminal.

4. The combination of claim 2 wherein said outer end of said positive and negative terminal is in operative electrical communication with said battery operated device.

5. The combination of claim 1 further comprising a transformer in operative electrical communication with said source module.

6. The combination of claim 5 wherein said operative electrical communication between said transformer and said source module further comprises a ribbon cable and a disconnect.

7. The combination of claim 5 wherein said energy source supplies a voltage to said transformer.

8. The combination of claim 7 wherein said transformer has a selector means for varying the voltage supplied to said source module.

9. The combination of claim 7 wherein said transformer provides the voltage required by the battery operated device.

10. A battery operated device having a battery receptacle for maintaining a plurality of batteries; and an external power supply device in operative electrical communication with an energy source, comprising:
  a source module having a positive and negative conductive terminal; said source module being removably positionable within said battery receptacle; said positive and negative terminal of said source module being in operative electrical communication with said energy source;
  at least one conductor module having a first end operatively electrically coupled to a second end; said conductor module being removably positionable within said battery receptacle;
  said positive and negative terminal of said source module being in operative electrical communication with said battery operated device; and
  said energy source supplying energy to said source module and said conductor module.

11. The external supply device of claim 10 wherein said source module has a battery shaped housing.

12. The external supply device of claim 11 wherein said housing of said source module is sized to generally correspond to the size of one of the plurality of batteries that is required by said battery operated device.

13. The external supply device of claim 10 wherein said conductor module has a battery shaped housing.

14. The external supply device of claim 13 wherein said housing of said conductor module is sized to generally correspond to the size of one of the plurality of batteries that said battery operated device requires.

15. The external supply device of claim 10 wherein said receptacle of said battery operated device maintains said source module and said at least one conductor module so that said positive and negative terminals of said source module are in operative electrical communication with said battery operated device.

16. The external supply device of claim 10 further comprising a plurality of conductor modules.

17. The external supply device of claim 10 further comprising a transformer in operative electrical communication with said source module.

18. The external supply device of claim 17 wherein said operative electrical communication between said transformer and said source module further comprises a ribbon cable and a disconnect.

19. The external supply device of claim 17 wherein said energy source supplies a voltage to said transformer.

20. The external supply device of claim 19 wherein said transformer has a selector means for varying the voltage supplied to said source module.

21. The external supply device of claim 20 wherein said selector means comprises a first and second switch; said first switch regulates the voltage required by the number of batteries said battery operated device requires; said second switch regulates the voltage required by the size of battery said battery operated device requires.

22. The external supply device of claim 20 wherein said transformer provides the voltage required by the battery operated device.

23. A method for providing an alternative energy source for a battery operated device, comprising the steps of:
  providing a battery operated device that requires at least one battery;
  providing a source module shaped to correspond to one of: a AAA battery, a AA battery, a C battery, a D battery and a 9 volt battery;
  providing a transformer having a means for varying the voltage of an energy source;
  positioning said source module so that said source module is in operative electrical communication with said battery operated device;
  operatively electrically connecting said source module to said transformer;
  operatively electrically connecting said transformer to said energy source; and
  providing energy from said energy source to said transformer; said transformer providing said source module with the voltage required by said battery operated device; said source module providing said battery operated device with the voltage.

24. A method for providing an alternative energy source for a battery operated device, comprising the steps of;
  providing a battery operated device that requires a plurality of batteries;
  providing a battery shaped source module;
  providing at least one battery shaped conductor module;
  providing a transformer having a means for varying the voltage of an energy source;
  positioning said source module so that said source module is in operative electrical communication with said battery operated device;
  positioning said at least one conductor module so that said conductor module is in operative electrical communication with said battery operated device;
  operatively electrically connecting said source module to said transformer;
  operatively electrically connecting said transformer to said energy source; and
  providing energy from said energy source to said transformer; said transformer providing said source module and said conductor module with the voltage required by said battery operated device; said source module and said conductor module providing said battery operated device with the voltage.

25. An external power supply adaptor for a battery operated device, comprising:
  a source module generally shaped to correspond to one of: a AAA battery, a AA battery, a C battery, a D battery and a 9 volt battery;
  the source module having a positive and negative terminal being adapted for operative electrical communication with a battery operated device; and
  a coupling for operatively electrically connecting said positive and negative terminals to an energy source to thereby provide energy to the source module.

26. An external power supply adaptor for a battery operated device, comprising:
  a source module having a positive and negative terminal adapted for operative electrical communication with a battery operated device;
  at least one conductor module having a first end portion operatively electrically coupled to a second end portion; and
  a coupling for operatively electrically connecting the positive and negative terminals of the source module to an energy source to thereby provide energy to the source module.

* * * * *